(12) United States Patent
Long et al.

(10) Patent No.: US 9,045,067 B2
(45) Date of Patent: Jun. 2, 2015

(54) EXTENDABLE VEHICLE SEAT COVER

(71) Applicants: Nancy E Long, Raleigh, NC (US); John O Long, Raleigh, NC (US); Brandon J Long, Raleigh, NC (US); Sarah K Long, Raleigh, NC (US); Meredith J Long, Raleigh, NC (US); Ryan D Long, Raleigh, NC (US)

(72) Inventors: Nancy E Long, Raleigh, NC (US); John O Long, Raleigh, NC (US); Brandon J Long, Raleigh, NC (US); Sarah K Long, Raleigh, NC (US); Meredith J Long, Raleigh, NC (US); Ryan D Long, Raleigh, NC (US)

( * ) Notice: Subject to any disclaimer, the term of this patent is extended or adjusted under 35 U.S.C. 154(b) by 0 days.

(21) Appl. No.: 14/021,283

(22) Filed: Sep. 9, 2013

(65) Prior Publication Data

US 2015/0069804 A1    Mar. 12, 2015

(51) Int. Cl.
*A47C 31/00* (2006.01)
*B60N 2/60* (2006.01)

(52) U.S. Cl.
CPC ............ *B60N 2/6036* (2013.01); *B60N 2/6027* (2013.01)

(58) Field of Classification Search
CPC ...... B60N 2/60; B60N 2/6027; B60N 2/6036; A47C 31/11; A47C 31/113; A47C 31/116
USPC ........... 297/219.1, 22, 228.1, 228.12, 228.13, 297/229, 248
See application file for complete search history.

(56) References Cited

U.S. PATENT DOCUMENTS

| | | | | |
|---|---|---|---|---|
| 1,955,040 | A * | 4/1934 | Wittcoff | 297/219.1 |
| 6,655,735 | B1 * | 12/2003 | Learning | 297/228.1 |
| 7,000,984 | B1 * | 2/2006 | Ward | 297/228.12 |
| 7,097,244 | B2 * | 8/2006 | Holmgren et al. | 297/219.12 |
| 7,637,567 | B2 * | 12/2009 | Neustat et al. | 297/228 |
| 7,931,335 | B1 * | 4/2011 | Siklosi et al. | 297/229 |
| 2009/0284056 | A1 * | 11/2009 | Chico | 297/228.1 |
| 2011/0074192 | A1 * | 3/2011 | Brown | 297/224 |

* cited by examiner

*Primary Examiner* — Philip Gabler
(74) *Attorney, Agent, or Firm* — Megan E. Lyman (57) ABSTRACT

The seat cover of the present invention is a generic, easy-to-use, temporary, reusable, absorbent, moisture impermeable, home launderable, protective vehicle seat cover designed for any seat with a headrest is disclosed. The present invention is designed to work with any type of seat (bucket or bench seat), or location of seat (front or back seat), or type of vehicle (sedan, van, truck, bus, train). The seat cover is able to be used individually or can be linked together to cover contiguous seats. Ii installs and removes quickly over a headrest being secured by VELCRO. The construction of the present invention uses multi-layer, elongated, rectangular materials, which loosely covers the front surfaces of the seat. The seat cover consists of two layers: an upper layer that absorbs wetness, dirt, odor, and other contaminants and wicks moisture away from the user; a lower layer that blocks any liquids or other contaminants from reaching the vehicle's upholstery. The design easily enables repeated installation-removal-laundering cycles. The seat cover is economically designed for home laundering and environmentally designed for efficient washing and drying.

19 Claims, 7 Drawing Sheets

EXTENDABLE VEHICLE SEAT COVER

FIELD OF INVENTION

The present invention relates to a temporary, reusable, absorbent, moisture impermeable vehicle seat cover anchored by a headrest. Moreover, the seat cover can be adapted to multiple environments including interior and exterior furniture.

BACKGROUND OF THE INVENTION

This invention relates generally to seat covers: specifically to a user installed vehicle seat cover that protects a vehicle seat's primary upholstery from moisture, dirt, odors, and other contaminants. The present invention has a moisture impermeable bottom layer and an absorbent top layer, using the vehicle seat's headrest to secure said seat cover to any type of seat. An optional headrest cover may be attached to the vehicle seat cover to protect the headrest.

People often get into their vehicle soaked, dirty, and smelly after physical activity. Most of these activity venues do not provide facilities for showering and changing clothes. Therefore, dirt, sweat, odor and other contaminants would be transferred to the seat unless an easy-to-install, temporary protective covering is installed prior to getting into the vehicle. A towel or other make-shift seat covers can be put over the vehicle seat, but it is difficult to keep such make-shift coverings in place. In addition, fluids, dirt and odor can still soak through to the seat. Currently, most vehicle seat covers only work well on bucket seats. The few that work on bench seats only work on front bench seats.

Commercially available semi-permanent and temporary-use vehicle seat covers utilize fastening schemes, mechanisms, and ties that substantially increase installation and removal time. None of the temporary use seat covers work on a rear seat configuration of a sedan-type vehicle. Many vehicle seat covers are vehicle specific. A majority of the available seat covers are only water resistant. Additionally, the expense of most current vehicle seat covers is prohibitive.

Temporary-use protective vehicle seat covers have been patented in the past. While these coverings may be suitable for the purposes for which they were designed, they would not accomplish the purposes of the present invention, as described herein. The present invention provides a temporary cover that can be used universally in all types of vehicle seats, while protecting the seat and being absorbent and comfortable for the user, without hindering the use of safety restraints.

SUMMARY OF THE INVENTION

The following presents a general summary of aspects of this invention in order to provide a basic understanding of the invention. This summary is not an extensive overview of the invention. It is not intended to identify key or critical elements of the invention or delineate the scope of the invention. The following summary merely presents some concepts of the invention in general form as a prelude to the more detailed description provided below.

The present invention discloses a protective seat cover designed to be used with either a vehicle bucket seat or vehicle bench seat where each seat has either an adjustable headrest or molded headrest regardless of a vehicle's type, make, or model. It installs and uninstalls quickly over the headrest using VELCRO, or hook and loop, to keep the cover in place. The upper layer of the vehicle seat cover is made of an absorbent material, which absorbs dirt, wetness, odor, and other contaminants. The lower layer of the vehicle seat cover is made of a moisture impermeable material, which prevents anything from seeping through to the upholstery. It is easily washed and dried using home laundering methods and will perform even after numerous launderings. The invention will be inexpensively priced relative to other vehicle seat covers because it uses readily available materials and is generically designed to fit any vehicle with headrests.

Accordingly, several objects and advantages of the present invention are:

(a) To provide a generic vehicle seat cover that utilizes the headrest as the primary anchor for the cover, giving it the ability to fit all types of vehicle seats (bucket seats, bench seats, front seats, back seats, etc.) and all types of vehicles (car, van, truck, bus, train, etc.).

(b) To provide a moisture impermeable and absorbent vehicle seat cover that protects vehicle upholstery from moisture, dirt, odor, and other contaminants without compromising comfort.

(c) To provide a substantially simplified, low-cost vehicle seat cover that can be easily installed and removed using VELCRO, or hook and loop, without the need of time-consuming fastening devices (such as elastic bands, hooks, clamps, zippers or straps) or an adapted pocket designed to fit over the top portion of only a bucket seat. The goal of the present invention is to promote maximum use.

(d) To provide a linking system to link several seat covers together to cover several contiguous seats, such as a bench seat, where each position has either an adjustable or molded headrest;

(e) To provide a vehicle seat cover that can withstand frequent laundering cycles using conventional household laundering methods.

(f) To provide the ability to reduce the environmental impact of laundering the vehicle seat cover by designing a system that increases washing efficiency and reduces overall drying time.

(g) To provide an optional headrest cover using the same material and construction as the present invention including ease of laundering and using VELCRO, or hook and loop, connections to secure the headrest cover to the seat cover.

Additional objects of the present invention will appear as the description proceeds.

The present invention overcomes the shortcomings of the prior art by providing a seat cover that will fit any vehicle seat that has a headrest (adjustable or molded) without regard as to the type of seat (bucket or bench) or the location of the seat (front or back) or the type of vehicle (sedan, van, truck, bus, train, etc.) while protecting the underlying seat from moisture, dirt, odors, and contaminants. It is constructed with a bottom layer comprised of moisture impermeable material and a top layer comprised of absorbent material. Each layer will be sized to appropriately cover the vehicle seat's seat portion on which a person's legs may be supported and a back portion against which a person's back may be disposed.

The objects and advantages will appear from the description to follow. Within the description, reference is made to the accompanying drawings. These are to be considered part of the description as they illustrate specific ways in which the invention may be used. These illustrations will be described in sufficient detail to provide an understanding of how to use the invention. It is to be understood that other uses may be utilized and structural changes may be made without departing from the scope of the invention.

Therefore, the following detailed description is not to be taken in a limited sense, and the scope of the present invention is best defined by the appended claims.

BRIEF DESCRIPTION OF DRAWINGS

A more complete understanding of the present invention and certain advantages thereof may be acquired by referring to the following description in consideration with the accompanying drawings, in which like reference numbers indicate like features and wherein.

LIST OF REFERENCE NUMBERS

The reference numbers list below will be used throughout the drawings:
- 10. Vehicle Seat Cover
- 11. Absorbent Material Layer
- 12. Moisture Impermeable Layer
- 13. VELCRO, or hook and loop, Strip
- 14. Snap Head
- 15. Snap Tail
- 16. Lock-stitching
- 17. Fabric thread, natural or synthetic
- 18a. Front side of opening on the extendable cover
- 18b. Front side connection of headrest cover
- 19a. Back side connection of headrest cover
- 19b. Back side opening on the extendable cover

DETAILED DESCRIPTION OF THE PREFERRED EMBODIMENT

The following discussion describes in detail one representation of the invention (and several variations of that representation). This discussion should not be considered as limiting the invention to the representations that follow, as experienced practitioners will recognize other representations as well. To understand the complete scope of the invention, the reader is directed to the appended claims.

Figure 1:
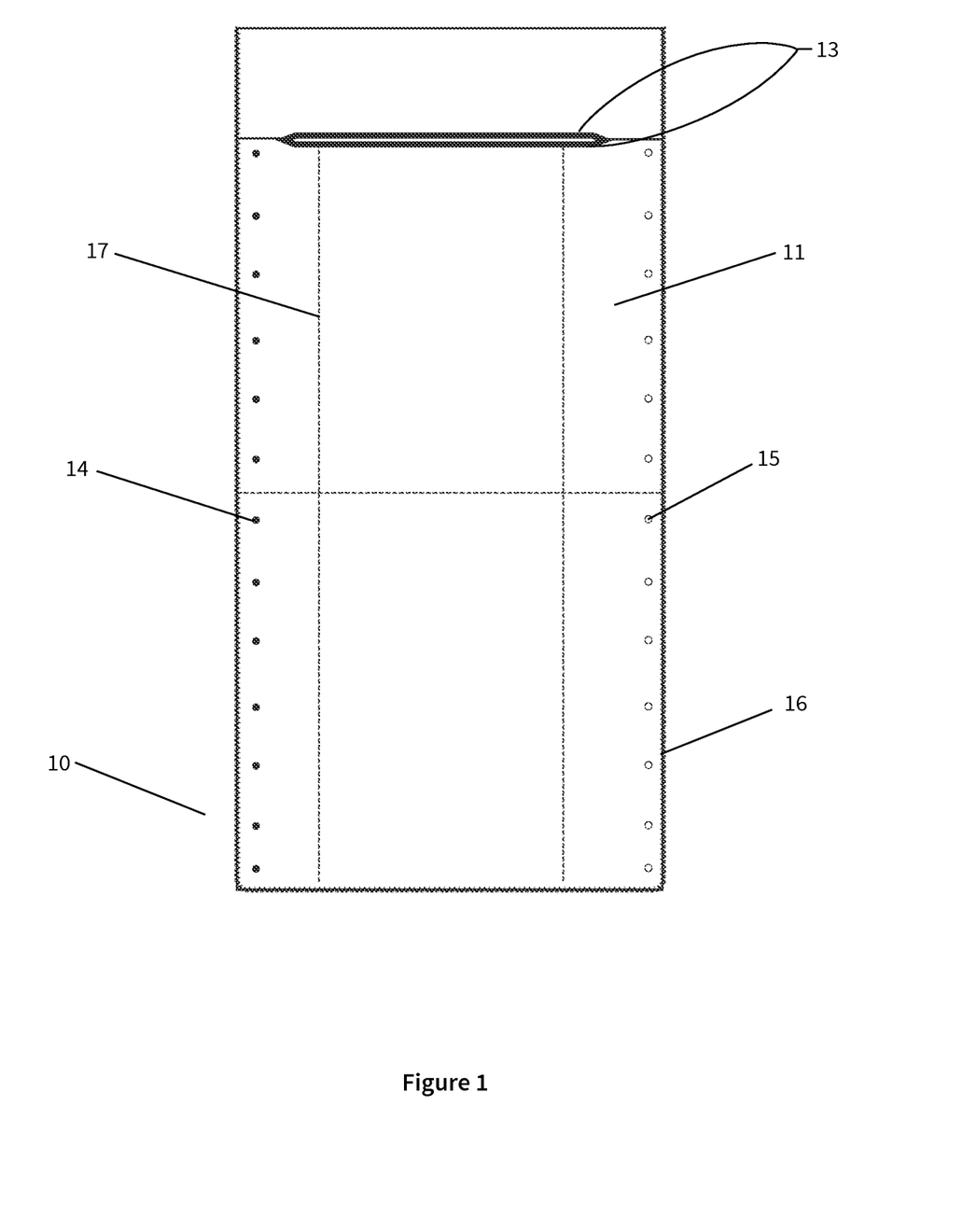
FIG. 1 is a perspective of the front of the vehicle seat cover (the part that touches the user), as in one embodiment of the present invention.
Figure 2:
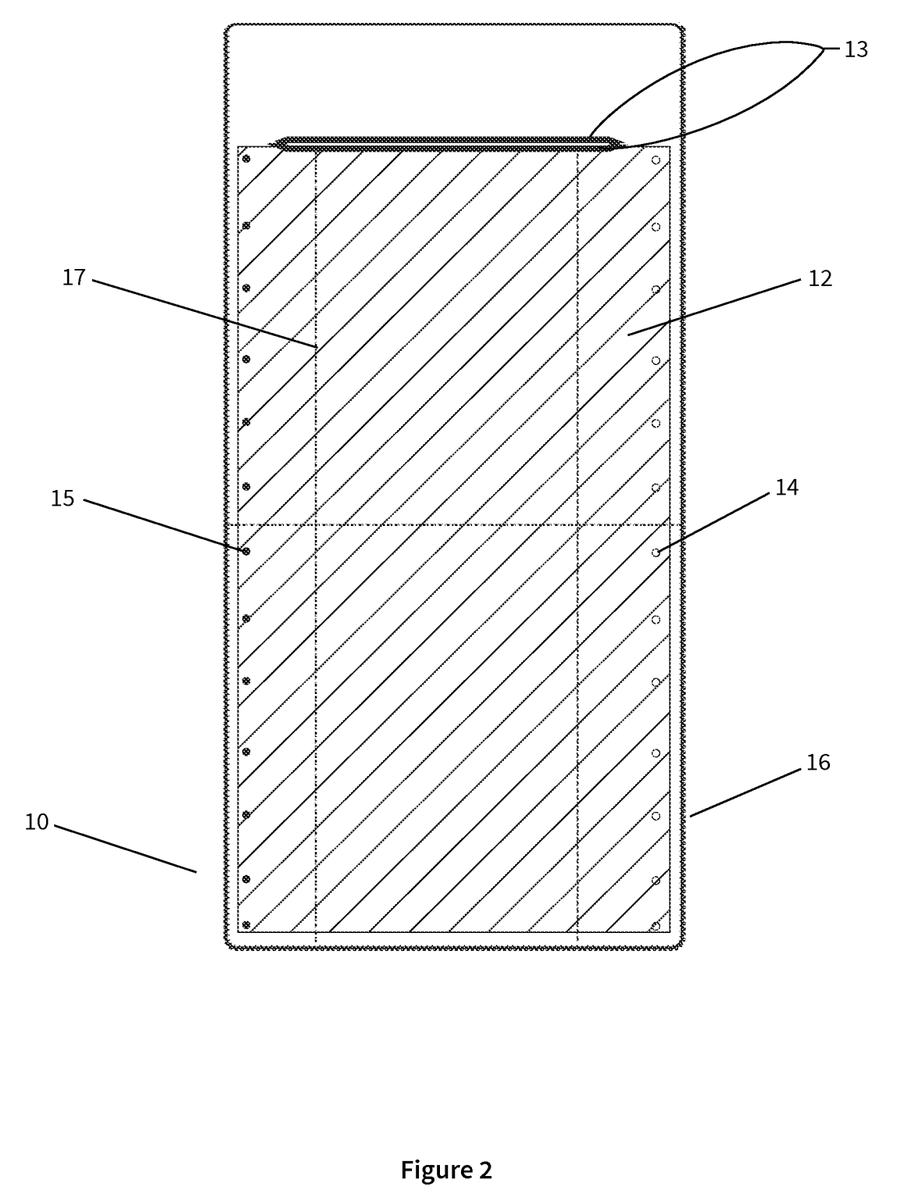
FIG. 2 is a perspective of the back of the vehicle seat cover (the part that touches the vehicle seat), as in another embodiment of the present invention.

FIGS. 1 & 2 show perspective views of the present invention (10). The present invention discloses a vehicle seat cover that is easily secured using a molded or adjustable vehicle headrest and is comprised of an absorbent layer of fabric (11) and a moisture impermeable layer of fabric (12). The geometry of the layers of fabric is sufficiently long and wide to cover upholstered surfaces of the vehicle seat that would otherwise be in direct contact with the seat's occupant. In one embodiment, the dimensions of the layers of fabric are approximately 60"×27". The fabrics are made of machine washable and machine dryable material. For instance, the absorbent layer of fabric (11) may be made from terrycloth. Also, the moisture impermeable layer of fabric (12) may be made from other materials that are well known in the art.

An opening in the upper end of the seat cover is surrounded by VELCRO, or hook and loop (13). This opening easily slips over the vehicle headrest to secure the device. It is further secured by attaching the VELCRO, or hook and loop (13) to itself so the opening snuggly fits around the headrest. VELCRO, or hook and loop (13) is secured to the seat cover opening using thread (17). In one embodiment, the size of the opening is approximately 18".

The snap heads (14) and snap tails (15) are used to accomplish two very important aspects of the vehicle cover (10). The first use is to keep the absorbent layer (11) turned outward during laundering for more efficient and environmentally friendly washing and drying of the vehicle seat cover. The second use of the snap heads (14) and snap tails (15) is to connect several vehicle seat covers together to cover a bench-type seat for two or more people. In one preferred embodiment, approximately 15 snap heads and tails are used. Moreover, as is known to those in the art, other methods of temporary fastening may be employed, such as, but not limited to VELCRO, hook and loop closures, buttons, and the like.

The edges of the materials are secured with a lock-stitching using thread (17). In addition, thread (17) is used in various patterns on the present invention (10) in order to secure the top absorbent fabric layer (11) to the bottom moisture impermeable fabric layer (12). Alternatively, the layers of fabric (11) and (12) may be adhered by other methods such as adhesives, heat, quilting and the like. Moreover, as is known the edges of the fabric layers may be secured by various other methods such as binding tape, stitching, adhesives and the like.

Figure 3:
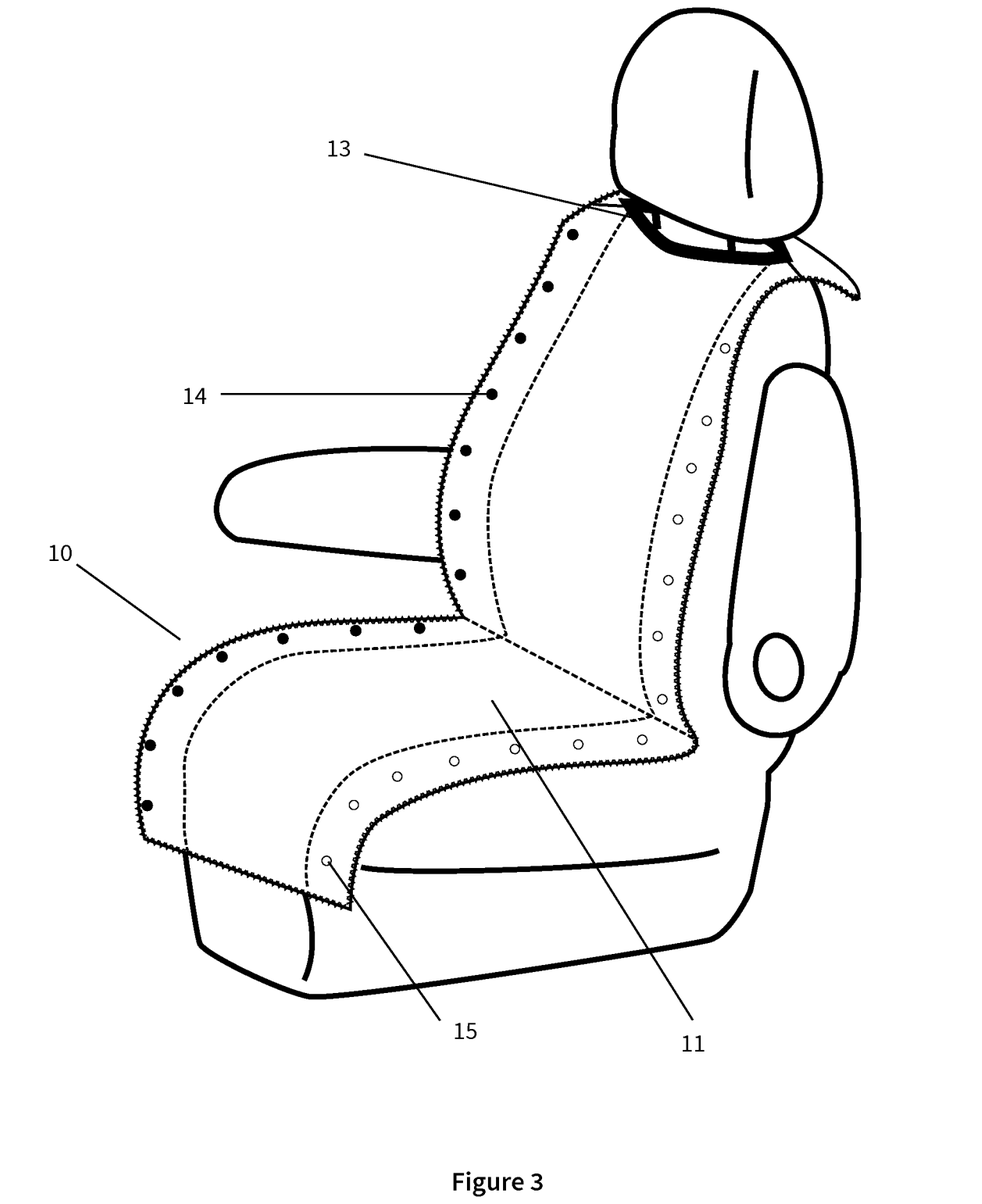
FIG. 3 is a perspective view of a vehicle seat cover as it would appear conforming to a typical vehicle seat with an adjustable headrest on a bucket seat, as in another embodiment of the present invention.

FIG. 3 shows a perspective view of the present invention (10) in use on a bucket-type seat with an adjustable vehicle headrest. The present invention (10) is comprised of an absorbent layer of fabric (11) and a moisture impermeable layer of fabric (12), as discussed above. The geometry of the layers of fabric is sufficiently long and wide to cover upholstered surfaces of the vehicle seat that would otherwise be in direct contact with the seat's occupant, as previously described. The fabrics are made of machine washable and machine dryable material, as previously described.

Figure 4:
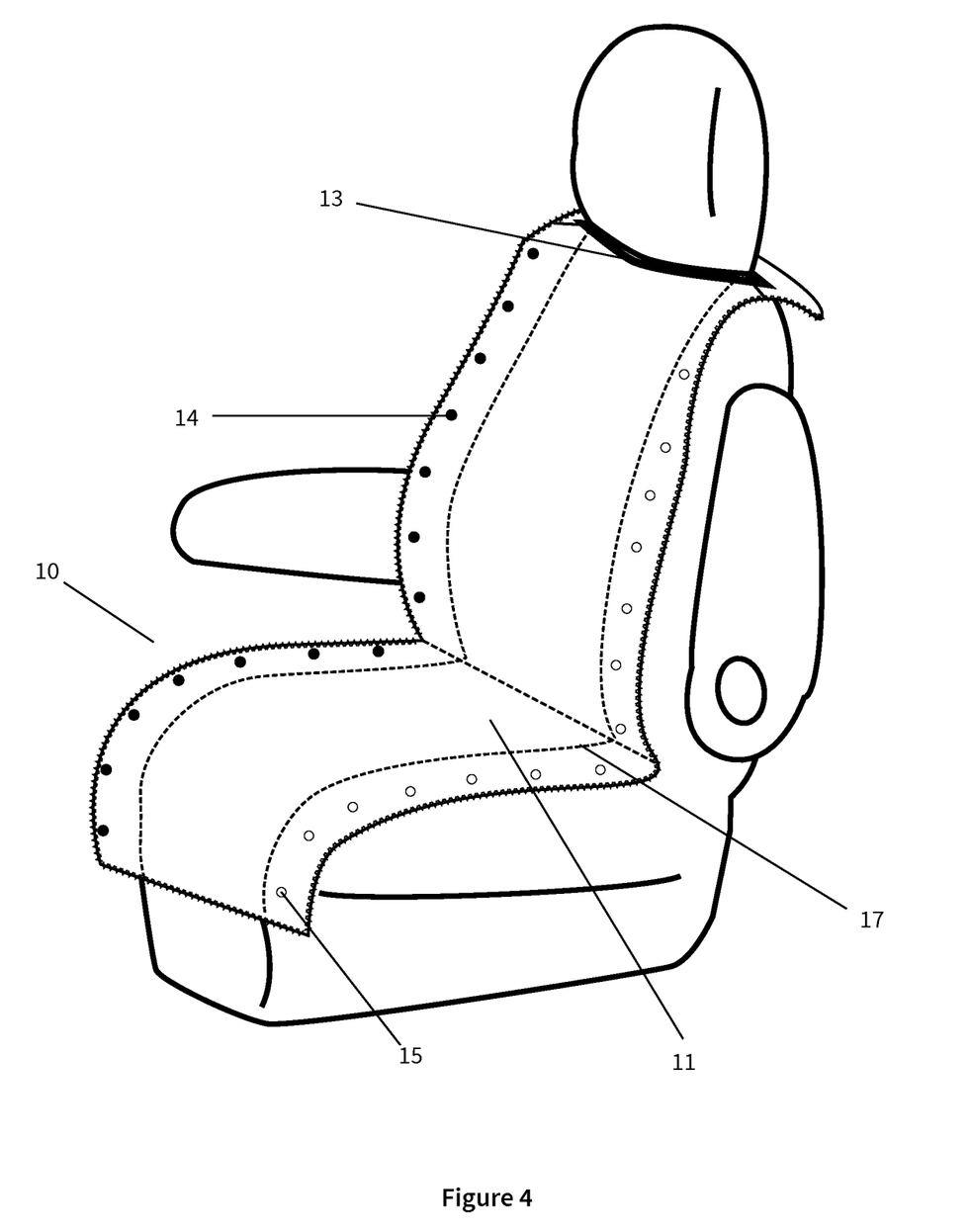
FIG. 4 is a perspective view of a vehicle seat cover as it would appear conforming to a typical vehicle with a molded headrest on a bucket seat, as in one embodiment of the present invention.

FIG. 4 shows a perspective view of the present invention (10) being used on a bucket-type seat with a molded vehicle headrest. The present invention (10) is comprised of an absorbent layer of fabric (11) and a moisture impermeable layer of fabric (12), as previously described. The geometry of the layers of fabric is sufficiently long and wide to cover upholstered surfaces of the vehicle seat that would otherwise be in direct contact with the seat's occupant, as previously described. The fabrics are made of machine washable and machine dryable material, as previously described.

Figure 5:
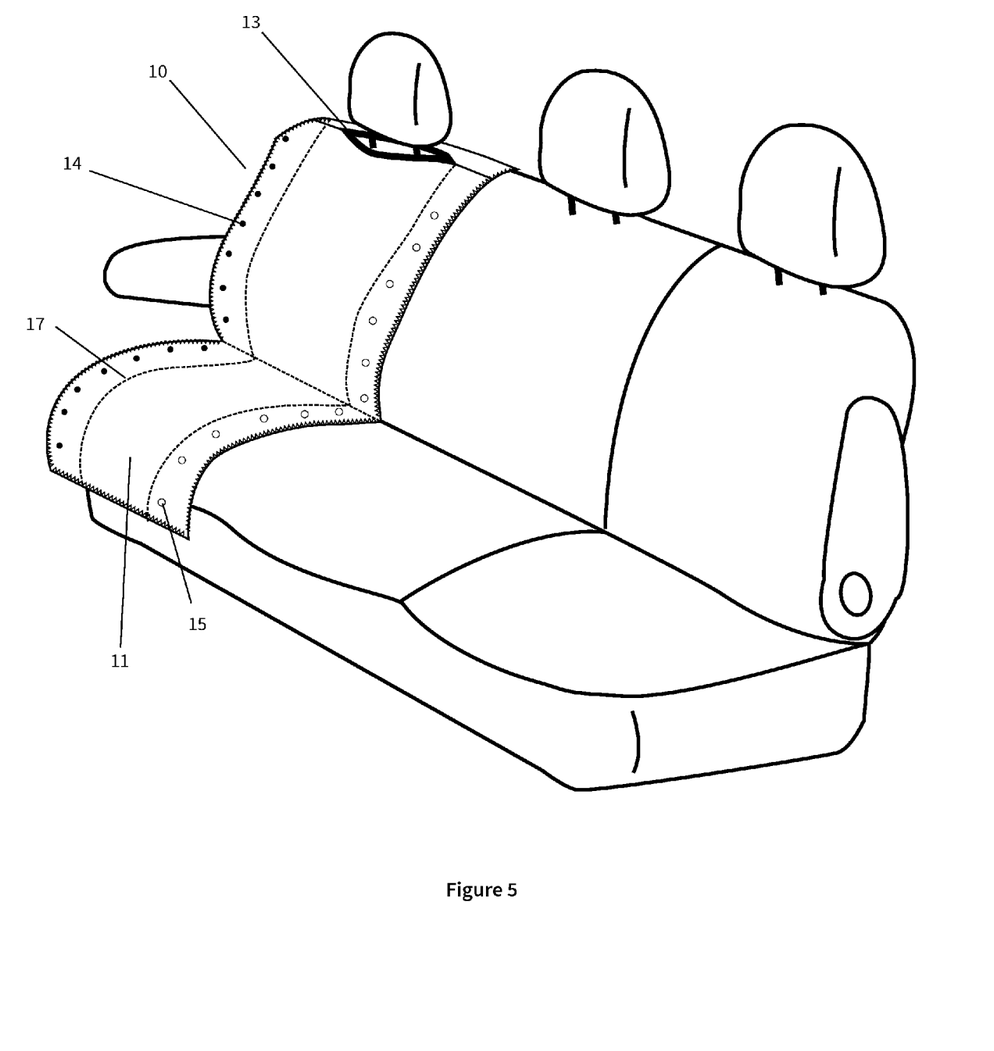
FIG. 5 is a perspective view of a vehicle seat cover as it would appear conforming to a typical vehicle on an adjustable headrest on a back seat of a sedan vehicle, as in one embodiment of the present invention.

FIG. 5 shows a perspective view of the present invention (10) being used on a bench-type seat with an adjustable headrest. The present invention (10) is comprised of an absorbent layer of fabric (11) and a moisture impermeable layer of fabric (12), as previously described. The geometry of the layers of fabric is sufficiently long and wide to cover upholstered surfaces of the vehicle seat that would otherwise be in direct contact with the seat's occupant, as previously described. The fabrics are made of machine washable and machine dryable material, as previously described.

Figure 6:
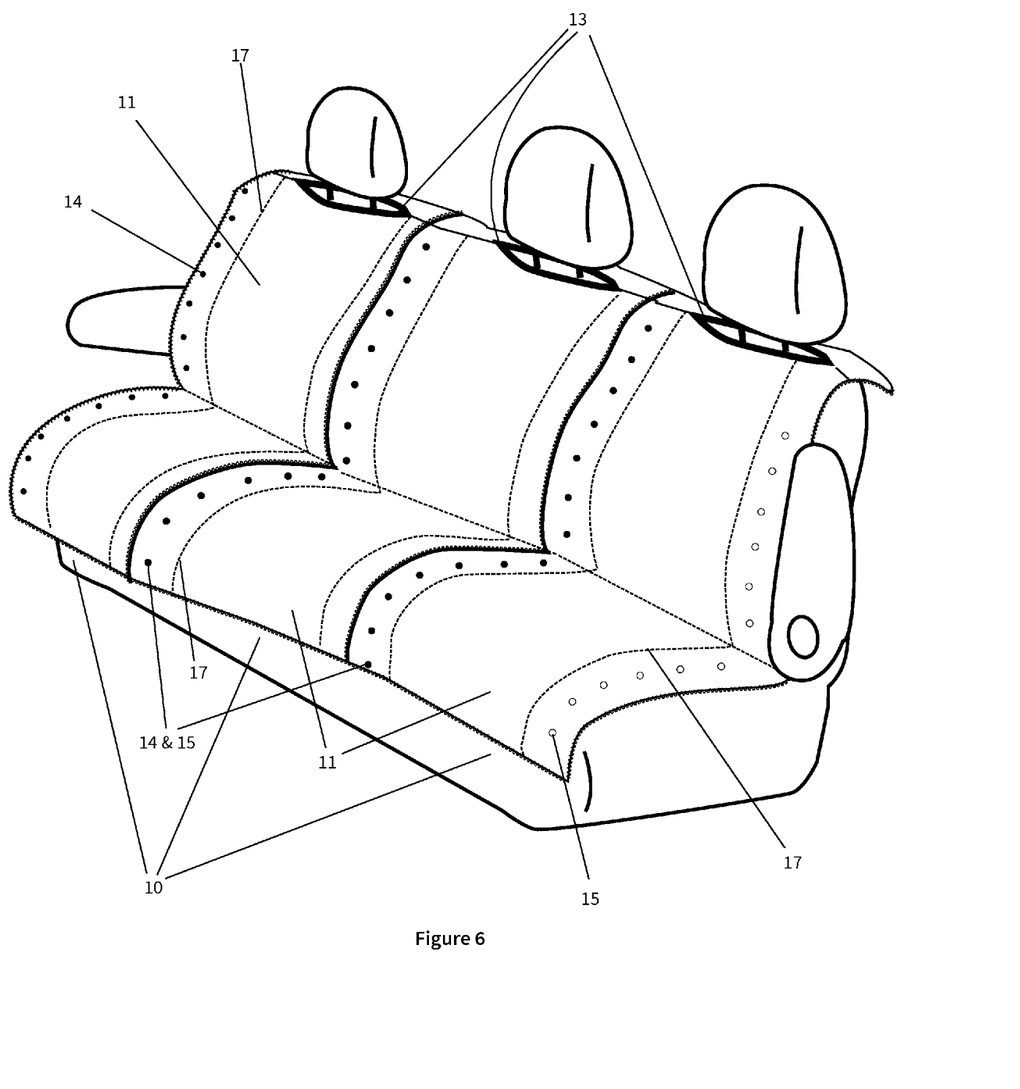
FIG. 6 is a perspective view of several linked vehicle seat covers as they would appear conforming to a typical automobile on a back bench seat with adjustable headrests, as in another embodiment of the present invention.

FIG. 6 shows a perspective view of several present inventions (10) being used on a bench-type seat with an adjustable headrest. The present inventions are connected to one another using the snap heads (14) and snap tails (15) snapping into each other to create one long cover on the vehicle seat in order to protect the whole seat. The present invention (10) is comprised of an absorbent layer of fabric (11) and a moisture impermeable layer of fabric (12), as previously described. The geometry of the layers of fabric is sufficiently long and wide to cover upholstered surfaces of the vehicle seat that would otherwise be in direct contact with the seat's occupant, as previously described. The layers may be in a rectangular shape, or any other shape that sufficiently covers a seat. The fabrics are made of machine washable and machine dryable material, as previously described.

All elements are necessary for the product to work. The absorbent material could be replaced with another material that is similarly absorbent. The moisture impermeable material could be replaced by another type of moisture impermeable material, which can be repeatedly laundered without compromising the integrity of the material. The lock-stitching could be replaced with a similar product or process that would keep the edges of the invention from fraying, as previously described. The VELCRO, or hook and loop, could be replaced with another type of fastener that would help to secure the seat cover to the headrest, as previously described. The snaps could be replaced with another type of fastener that would allow multiple seat covers to be connected and provide efficient and environmentally friendly home laundering, as previously described. The product could be manufactured in a wide variety of colors and/or decorated with a team, organization, or regional logo. In another embodiment, the edges of the seat cover could have elastic to shape the seat cover to the seat. All additions, replacements or substitutions are required to be inexpensive in order to maintain economical pricing.

Figure 7:
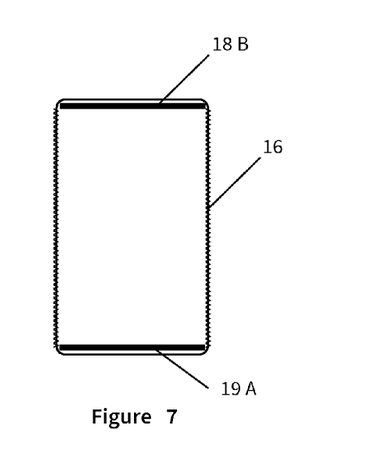
FIG. 7 is a front view of the headrest cover of the extendable cover.
Figure 8:
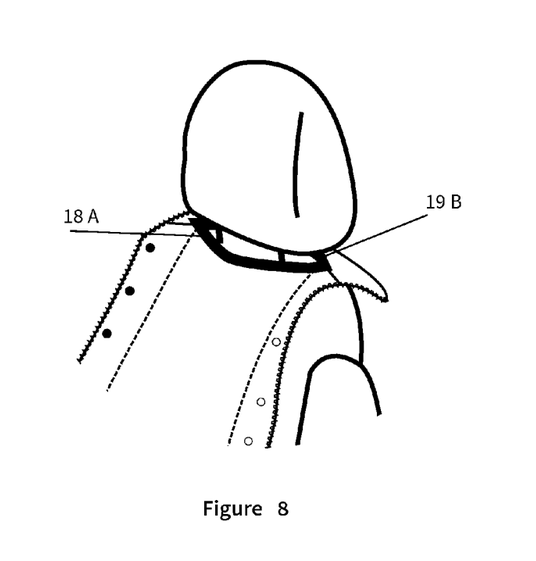
FIG. 8. Is a front view of the opening in the extendable cover that goes over the headrest of a seat, as in one embodiment.
Figure 9:
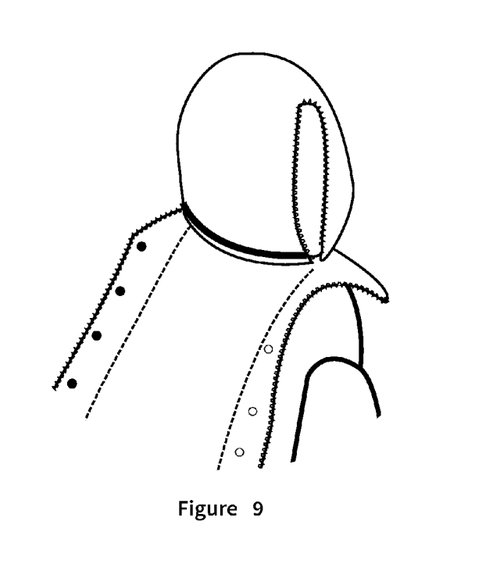
FIG. 9 is a front view of the headrest cover and extendable cover as positioned on a seat as in another embodiment of the extendable cover.

An absorbent headrest cover could be added (FIG. 7). The absorbent headcover would be constructed from an absorbent layer of fabric and a moisture impermeable layer of fabric identical to the vehicle seat cover materials, as previously described. The headrest cover is attached to the vehicle seat cover using VELCRO, or hook and loop, strips on the vehicle seat cover, 18a and 19b (FIGS. 8 and 9), and corresponding VELCRO, or hook and loop, strips on either end of the headrest cover 19a and 18b (FIGS. 7 and 9). In one embodiment, the dimensions of the headrest cover would be approximately 18"×24".

It is contemplated that the vehicle seat cover could be modified to be used on non-vehicle seats. By removing the hole for the vehicle headrest, the vehicle seat cover could be used to cover chairs or couches. This arrangement could be useful for an incontinent individual, or for the preservation of upholstery in general.

It is further contemplated that the vehicle seat cover could be used to cover a child's vehicle booster seat. It would still be secured by the vehicle's headrest as long as all the straps for the booster seat were not impeded by the vehicle seat cover. Or the vehicle seat cover could be modified to accommodate all the straps for the booster seat.

The vehicle seat cover could be used as a pet seat cover in a vehicle or any other type of seating situation for a pet.

The vehicle seat cover could be modified to attach to a wheelchair to provide greater comfort and as protection/absorption of any problems that may occur due to incontinence.

While the invention has been shown and described herein with reference to particular embodiments, it is to be understood that the various additions, substitutions, or modifications of form, structure, arrangement, proportions, materials, and components and otherwise, used in the practice and which are particularly adapted to specific environments and operative requirements, may be made to the described embodiments without departing from the spirit and scope of the present invention. Accordingly, it should be understood that the embodiments disclosed herein are merely illustrative of the principles of the invention. Various other modifications may be made by those skilled in the art, which will embody the principles of the invention and fall within the spirit and the scope thereof.

We claim:

1. An extendable cover comprising:
   at least one layer of absorbent material;
   at least one layer of moisture impermeable material that does not degrade at high temperatures used in laundering; and
   wherein the surface area of said at least one layer of absorbent material is contact with the surface area of said at least one layer of moisture impermeable material to create a combined layer, said layer of moisture impermeable material to be in contact with a seat and said absorbent material to be in contact with the impermeable material and with a user of said seat, and wherein the combined layer is of sufficient size to cover the seat, said combined layer having an opening at an upper end, said opening having a hook and loop closure, said opening being a sufficient size to receive a vehicle headrest, and wherein one side of the combined layer located perpendicular to the opening of has a plurality of fasteners, the other side located across from the plurality of fasteners of the combined layer having a plurality of fastener receivers, and wherein the fasteners may attach to the fastener receivers of at least one other extendable cover and said fasteners may be secured to the fastener receivers during the laundering of the extendable cover.

2. The extendable cover of claim 1, wherein one extendable cover is connected to at least one adjacent extendable cover by connecting the fasteners of one cover with the fastener receivers of the adjacent cover, and wherein a plurality of seat covers are used to cover a bench type seat.

3. The extendable cover of claim 1, wherein the layer of absorbent material is affixed to the layer of moisture impermeable material.

4. The extendable cover of claim 1, wherein the combined layer is machine washable and machine dryable without losing integrity.

5. The extendable cover of claim 1, wherein a headrest cover is placed over the headrest, said headrest cover having hook and loop to be secured to the cover by the hook and loop closure at the opening at the upper end.

6. The extendable cover of claim 1, wherein the edges of the combined layer are affixed with lock-stitching.

7. The extendable cover of claim 1, wherein the fasteners are snap heads and the fastener receivers are snap tails.

8. An extendable vehicle seat cover comprising:
   at least one layer of absorbent material;

at least one layer of moisture impermeable material that does not degrade at high temperatures used in laundering; and wherein the surface area of said at least one layer of absorbent material is in contact with the surface area of said at least one layer of moisture impermeable material to create a combined layer, said layer of moisture impermeable material to be in contact with a vehicle seat and said absorbent material to be in contact with the impermeable material and with a user of said vehicle seat, and wherein the combined layer is of sufficient size to cover the vehicle seat, said combined layer having an opening at an upper end, said opening having a hook and loop closure, said opening of a sufficient size to receive a vehicle headrest, and wherein one side of the combined layer located perpendicular to the opening has a plurality of snap heads, the other side located across from the plurality of snaps heads of the combined layer having a plurality of snap tails, and wherein the snap heads may attach to the snap tails of at least one other extendable cover and said snap heads may be secured to the snap tails during the laundering of the extendable cover.

9. The extendable vehicle seat cover of claim 8, wherein one extendable vehicle seat cover is connected to at least one adjacent extendable cover by connecting the fasteners of one cover with the fastener receivers of the adjacent cover, and wherein a plurality of seat covers are used to cover a bench seat in a vehicle, and allowing at least one seat restraint buckle to fit between said snap heads and said snap tails.

10. The extendable vehicle seat cover of claim 8, wherein the layer of absorbent material is affixed to the layer of moisture impermeable material.

11. The extendable vehicle seat cover of claim 8, wherein the combined layer is machine washable and machine dryable without losing integrity.

12. The extendable vehicle seat cover of claim 8, wherein a second cover is placed over the headrest, said cover secured by the hook and loop closure at the opening at the upper end.

13. The extendable vehicle seat cover of claim 8, wherein the edges of the combined layer are affixed with lock-stitching.

14. An extendable vehicle seat cover comprising:
at least one layer of absorbent material that does not degrade at high temperatures used in laundering;
at least one layer of moisture impermeable material; and
wherein the surface area of said at least one layer of absorbent material is in contact with the surface area of said at least one layer of moisture impermeable material to create a combined layer, said layer of moisture impermeable material to be in contact with the vehicle seat and said absorbent material to be in contact with the impermeable material and with a user of said vehicle seat, and wherein the combined layer is of sufficient size to cover the vehicle seat, said combined layer having an opening at an upper end, said opening having a hook and loop closure, said opening of a sufficient size to receive a vehicle headrest, and wherein one side of the combined layer located perpendicular to the opening has a plurality of snap heads, the other side located across from the plurality of snaps heads of the combined layer having a plurality of snap tails wherein the snap heads may attach to the snap tails of at least one other extendable cover and said snap heads may be secured to the snap tails during the laundering of the extendable cover, and having a headrest cover comprising:
at least one layer of absorbent material and at least one layer of moisture impermeable material, said layers being adjacent to one another and forming a combined layer, the combined layer of a sufficient size and shape to encase a vehicle headrest and having an opening, one edge of said opening having hook and an other edge of said opening having loop, such that the hook and loop of the headrest cover may affix to the hook and loop of the extendable seat cover opening.

15. The extendable vehicle seat cover of claim 14, wherein one extendable vehicle seat cover is connected to at least one adjacent extendable cover by connecting the fasteners of one cover with the fastener receivers of the adjacent cover, and wherein a plurality of seat covers are used to cover a bench seat in a vehicle.

16. The extendable vehicle seat cover of claim 14, wherein the layer of absorbent material is affixed to the layer of moisture impermeable material.

17. The extendable vehicle seat cover of claim 14, wherein the combined layer is machine washable and machine dryable without losing integrity.

18. The extendable vehicle seat cover of claim 14, wherein the cover is secured to the seat at the juncture of the back and bottom portion of the seat, and may be installed and removed quickly.

19. The extendable vehicle seat cover of claim 14, wherein the edges of the combined layer are affixed with lock-stitching.

* * * * *